US010602007B2

(12) United States Patent
Takano (10) Patent No.: US 10,602,007 B2
(45) Date of Patent: Mar. 24, 2020

(54) INFORMATION PROCESSING APPARATUS CONFIGURED TO BLOCK INPUTS FROM AN OPERATION PANEL WHEN THE OPERATION PANEL IS SWIVELED

(71) Applicant: TOSHIBA TEC KABUSHIKI KAISHA, Tokyo (JP)

(72) Inventor: Yutaka Takano, Izunokuni Shizuoka (JP)

(73) Assignee: TOSHIBE TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/028,909

(22) Filed: Jul. 6, 2018

(65) Prior Publication Data

US 2019/0028598 A1 Jan. 24, 2019

(30) Foreign Application Priority Data

Jul. 21, 2017 (JP) ................. 2017-141824

(51) Int. Cl.
| | |
|---|---|
| H04N 1/00 | (2006.01) |
| B41J 3/46 | (2006.01) |
| H04N 1/23 | (2006.01) |
| B41J 29/13 | (2006.01) |
| G06F 3/041 | (2006.01) |
| G06F 3/12 | (2006.01) |

(52) U.S. Cl.
CPC ............ *H04N 1/00543* (2013.01); *B41J 3/46* (2013.01); *B41J 29/13* (2013.01); *G06F 3/041* (2013.01);

(Continued)

(58) Field of Classification Search
CPC ... B41J 29/13; B41J 3/46; G06F 3/041; G06F 3/1219; G06F 3/1235; H04N 1/00543;
(Continued)

(56) References Cited

U.S. PATENT DOCUMENTS

| | | | |
|---|---|---|---|
| 6,373,213 B1 * | 4/2002 | Watanabe | B60K 35/00 |
| | | | 318/445 |
| 2003/0110441 A1 * | 6/2003 | Tsukuda | B41J 3/4075 |
| | | | 715/255 |

(Continued)

FOREIGN PATENT DOCUMENTS

| | | |
|---|---|---|
| JP | 2002-055501 A | 2/2002 |
| JP | 2003-231328 A | 8/2003 |

(Continued)

OTHER PUBLICATIONS

Extended European Search Report dated Nov. 26, 2018, filed in counterpart European Patent Application No. 18184225.3, 10 pages.

*Primary Examiner* — Chad Dickerson
(74) *Attorney, Agent, or Firm* — Kim & Stewart LLP (57) ABSTRACT

An information processing apparatus includes a casing, a cover that is movable to an open position to provide access to an interior of the casing, an operation panel configured to receive an input operation and mounted on the casing to be movable between a first position at which the operation panel interferes with the opening of the cover and a second position at which the operation panel does not interfere with the opening of the cover, and a control unit including a processor that is configured to block any input operation received by the operation unit when the operation panel moves to the second position.

10 Claims, 7 Drawing Sheets

(52) U.S. Cl.
CPC .......... *G06F 3/1219* (2013.01); *G06F 3/1235* (2013.01); *H04N 1/00411* (2013.01); *H04N 1/00631* (2013.01); *H04N 1/00665* (2013.01); *H04N 1/00925* (2013.01); *H04N 1/2376* (2013.01)

(58) Field of Classification Search
CPC .......... H04N 1/00631; H04N 1/00665; H04N 1/00777; H04N 1/00925; H04N 1/2376; H04N 1/00411
USPC ......... 358/1.11–1.18, 400–404, 1.1, 1.9, 2.1, 358/437; 399/107, 110; 101/35, 37, 212, 101/213, 93.27
See application file for complete search history.

(56) References Cited

U.S. PATENT DOCUMENTS

| | | | |
|---|---|---|---|
| 2005/0163551 A1* | 7/2005 | Okochi | B41J 3/4075 400/83 |
| 2006/0171734 A1* | 8/2006 | Maeda | G03G 15/5016 399/81 |
| 2007/0231039 A1* | 10/2007 | Suzuki | G06F 17/211 400/76 |
| 2008/0181702 A1* | 7/2008 | Suzuki | B41J 3/4075 400/61 |
| 2008/0316541 A1* | 12/2008 | Takata | G03G 15/5016 358/401 |
| 2014/0376018 A1* | 12/2014 | Ikeda | H04N 1/00925 358/1.13 |
| 2015/0199668 A1* | 7/2015 | Fernando | G06Q 20/203 705/14.65 |
| 2015/0309469 A1 | 10/2015 | Kusano et al. | |

FOREIGN PATENT DOCUMENTS

| | | | |
|---|---|---|---|
| JP | 2007-030216 A | | 2/2007 |
| JP | 2007-086733 A | | 4/2007 |
| JP | 2007-130967 A | | 5/2007 |
| JP | 2010-039391 A | | 2/2010 |
| JP | 2010039391 A | * | 2/2010 |
| JP | 2015114345 A | * | 6/2015 |
| JP | 6160468 B2 | | 7/2017 |

* cited by examiner

INFORMATION PROCESSING APPARATUS CONFIGURED TO BLOCK INPUTS FROM AN OPERATION PANEL WHEN THE OPERATION PANEL IS SWIVELED

CROSS-REFERENCE TO RELATED APPLICATION

This application is based upon and claims the benefit of priority from Japanese Patent Application No. 2017-141824, filed Jul. 21, 2017, the entire contents of which are incorporated herein by reference.

FIELD

Embodiments described herein relate generally to an information processing apparatus configured to block inputs from an operation panel when the operation panel is swiveled.

BACKGROUND

In order to realize miniaturization and space saving while providing an operation panel that is sufficiently large, the operation panel of an information processing apparatus may be installed on a main body portion that includes a printer or the like. In such an information processing apparatus, a casing that covers an upper surface of the main body portion may be configured to be opened and closed so that paper using in printing can be replenished or exchanged. During the opening and closing of the casing, the operation panel is swiveled with respect to the main body portion so that it is retracted to a position that does not interfere with the opening and closing of the casing.

In the information processing apparatus as described above, when the operation panel is swiveled, an operator may erroneously touch the operation panel and cause an unintended input to be made.

DETAILED DESCRIPTION

Embodiments provide an information processing apparatus configured to block inputs from an operation panel when the operation panel is swiveled to reduce unintended operations on the operation panel by an operator.

In general, according to an embodiment, there is provided an information processing apparatus including a casing, a cover that is movable to an open position to provide access to an interior of the casing, an operation panel configured to receive an input operation and mounted on the casing to be movable between a first position at which the operation panel interferes with the opening of the cover and a second position at which the operation panel does not interfere with the opening of the cover, and a control unit including a processor that is configured to block any input operation received by the operation unit when the operation panel moves to the second position.

Figure 1:
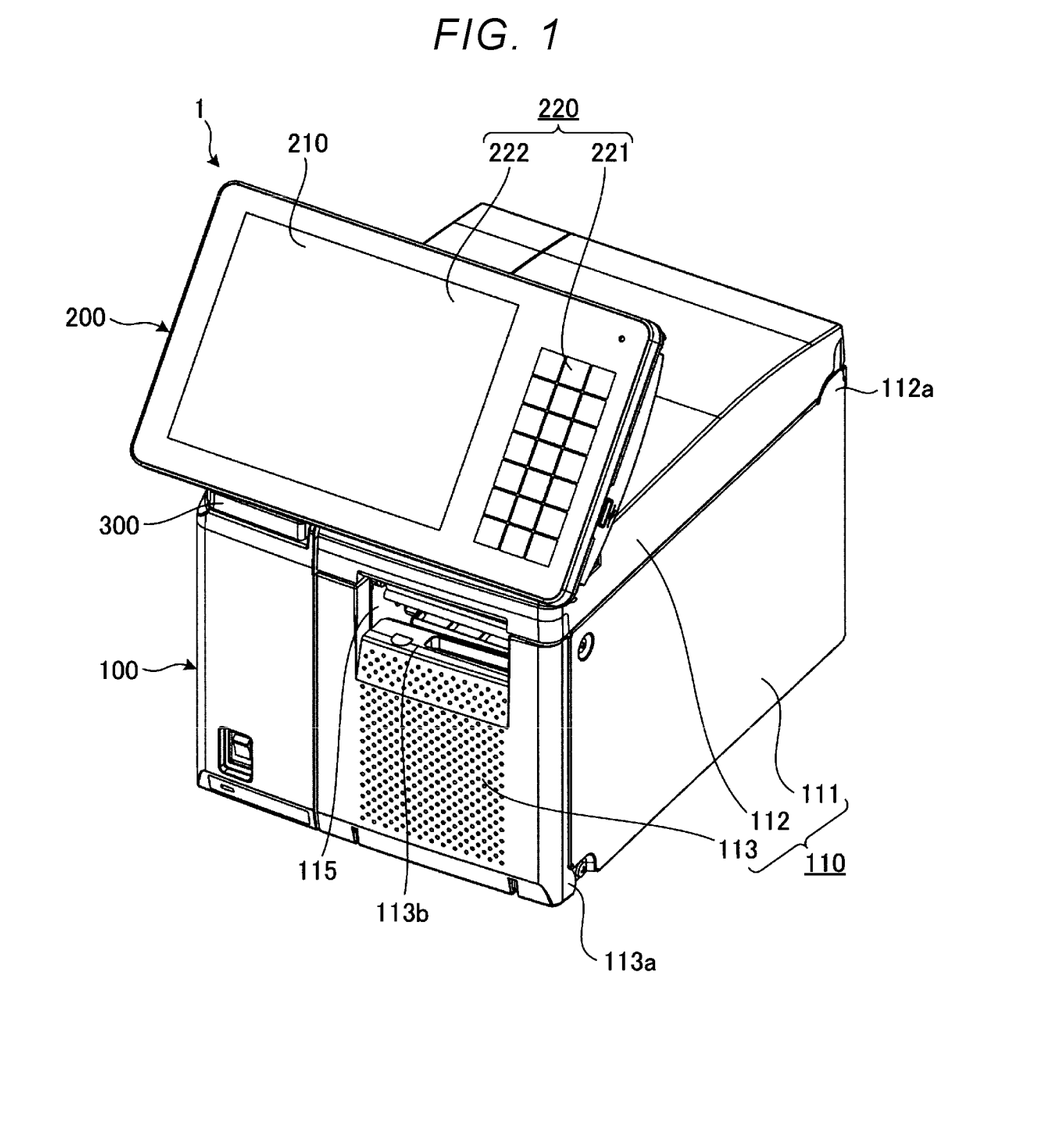
FIG. 1 is a perspective view illustrating an external appearance of a label printer according to an embodiment.

Embodiments will be described with reference to the drawings. FIG. 1 is a perspective view illustrating an external appearance of a label printer 1, which is an example of an information processing apparatus. The label printer 1 includes a main body portion 100 and an operation panel 200.

The operation panel 200 includes a display unit 210 and an input panel 220. The display unit 210 is, for example, a Liquid Crystal Display (LCD), and displays information to an operator using images and characters. The input panel 220 includes a keyboard 221 and a touch panel 222. The touch panel 222 is provided so as to be superimposed on the surface of the display unit 210 and receives an operation according to the display screen of the display unit 210. The keyboard 221 includes a plurality of push buttons (e.g., keys).

The main body portion 100 includes a casing 110, a paper storage unit 120, a printing unit 130, a backing paper winding unit 140, a control unit 150, and the like. The control unit 150 controls each unit (printing unit 130, backing paper winding unit 140, operation panel 200).

The casing 110 is a box-shaped container having a substantially rectangular parallelepiped shape and accommodates each unit described above (paper storage unit 120, printing unit 130, backing paper winding unit 140, control unit 150, and the like). The casing 110 includes a base portion 111, an upper cover 112, and a front cover 113.

Figure 2:
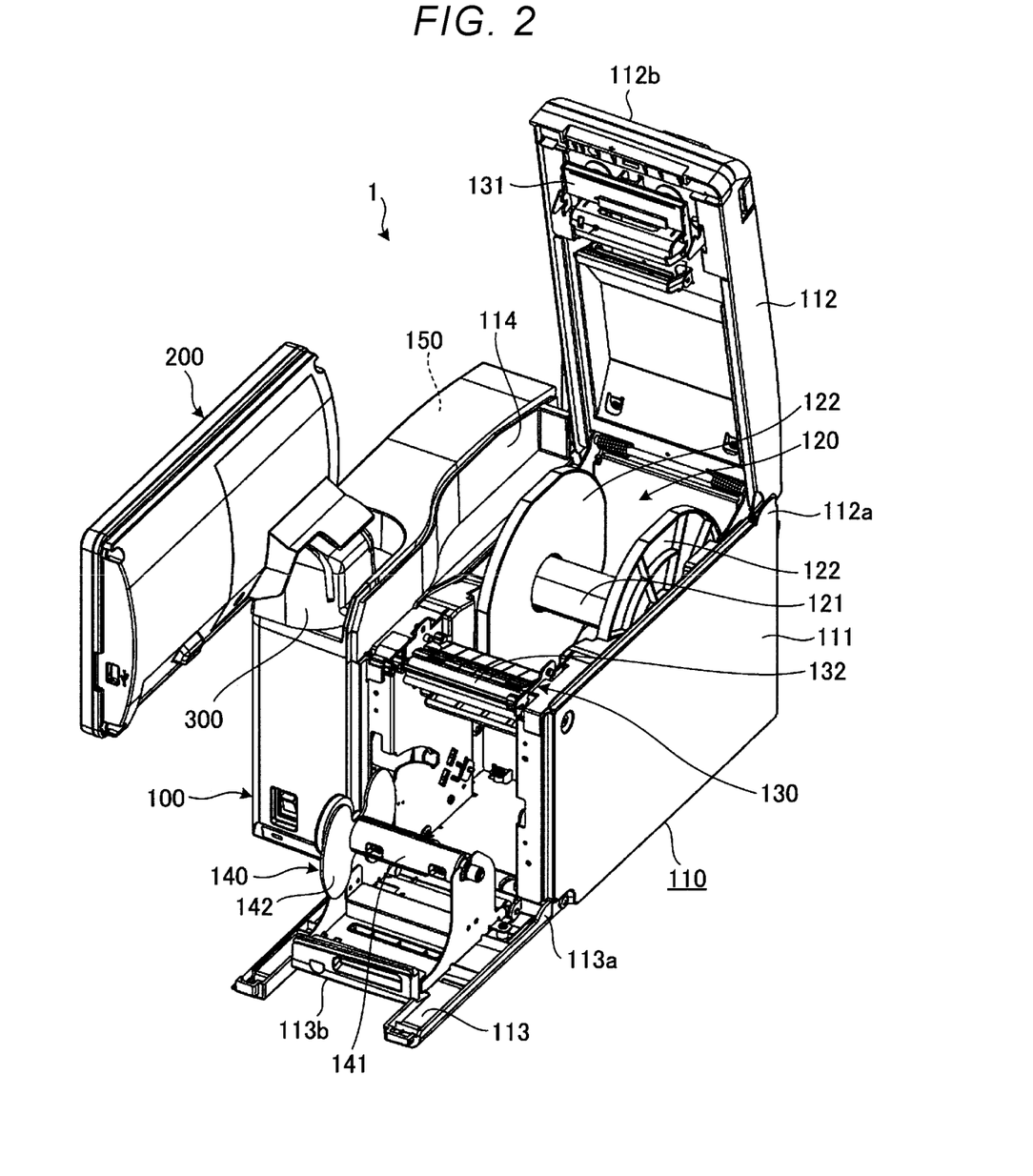
FIG. 2 is a perspective view illustrating the label printer in a state where an upper cover and a front cover are opened.

FIG. 2 is a perspective view illustrating the label printer 1 in a state where the upper cover 112 and the front cover 113 are opened. The base portion 111 is a portion other than the upper cover 112 and the front cover 113 among the components constituting the casing 110. The base portion 111 is divided into right and left portions in plan view, and one side (right side portion in this embodiment) is larger than the other side (left side portion). The left portion and the right portion of the base portion 111 are separated by a wall 114.

The upper cover 112 partially opens and closes the upper surface of one side (right side portion in this embodiment) of the casing 110, which is divided by the wall 114. The upper cover 112 has a substantially rectangular outer shape and the short side on the far side is rotatably attached to the upper-end portion on the rear side of the right side portion of the base portion 111. An axis serving as the center of rotation of the upper cover 112 is illustrated as the rotation shaft 112a in the drawing. The upper cover 112 moves between an open position where the casing 110 is opened and a closed position where the upper cover 112 is closed according to the rotation. The casing 110 is opened and closed as the upper cover 112 rotates.

The front cover 113 is at the front of one side (right side portion in this embodiment) of the casing 110, which is divided by the wall 114. The front cover 113 is a door that partially opens and closes the front surface of the casing 110. The front cover 113 has a substantially square outer shape, and the lower side thereof is rotatably attached to the lower end portion of the base portion 111 at the near side of the right side portion of the base portion 111. An axis serving as the center of rotation of the front cover 113 is illustrated as a rotation shaft 113a in the drawing. The front cover 113 moves between an open position where the casing 110 is opened and a closed position where the front cover 113 is closed according to the rotation. The casing 110 is opened and closed as the front cover 113 rotates.

The paper storage unit 120, the printing unit 130, and the backing paper winding unit 140 are provided on a side (right side portion in this embodiment) that is opened and closed by the upper cover 112 of the casing 110. The control unit 150 is accommodated in a side (left side portion in this embodiment) separated by the wall 114, which is not opened even when the upper cover 112 and the front cover 113 are opened.

The paper storage unit 120 stores roll paper. The paper storage unit 120 includes a shaft 121 that passes through the winding center of the roll paper and a pair of side plates 122 that presses both side ends of the roll paper.

The roll paper is a wound paper. The paper is, for example, a label roll, a label without a backing paper, a receipt paper, or the like. The label roll is a roll to which label is stuck side by side to a strip-type backing paper. The label is a label in which one surface of a piece of paper of a predetermined size is a printing surface and an adhesive layer is provided on the rear side of the printing surface. The label without the backing paper is a strip-type label is wound without a backing paper. The receipt paper is a strip-type paper.

The printing unit 130 prints on the paper fed from the paper storage unit 120. The printing unit 130 includes a print head 131 and a platen roller 132. The print head 131 is, for example, a thermal head, and emits heat for coloring the color former provided on the printing surface of the thermal paper. The platen roller 132 is a roller having elasticity at the surface layer portion, and rotates while pressing a paper (label or receipt paper) against the print head 131 to transport the paper. The print head 131 is attached to the inner surface of the upper cover 112. The platen roller 132 is provided on the base portion 111.

The paper printed by the printing unit 130 is discharged through an issuing port 115 (see FIG. 1) provided on the front surface of the casing 110. The is suing port 115 is formed between the moving end of the upper cover 112 and the moving end of the front cover 113 when both the upper cover 112 and the front cover 113 are in a position to close the casing 110. The front cover 113 has a concave portion 113b that is lower at the center portion of the upper-end portion than at both side end portions. The concave portion 113b and the front end 112b of the upper cover 112 form the issuing port 115.

When the paper storage unit 120 stores the label roll, the backing paper winding unit 140 winds up the backing paper after the label is peeled off. The backing paper winding unit 140 includes a winding shaft 141 that serves as a winding center while holding the front end portion of the backing paper, and a side plate 142 that regulates side edges of the backing paper.

The backing paper winding portion 140 is attached to the inner surface of the front cover 113 and is drawn out of the casing 110 when the front cover 113 is opened. In a state where the front cover 113 is closed, the backing paper winding portion 140 is positioned on the lower side of the printing unit 130.

Here, the label printer 1 further includes a swivel unit 300. The lower end portion of the operation panel 200 on the left side thereof is connected to the upper surface of the left side portion of the main body portion 100 through the swivel unit 300. The swivel unit 300 supports the operation panel 200 so as to be rotatable in the swivel direction. Here, the swivel is a rotation around a rotational axis that is aligned substantially along the vertical direction. The swivel unit 300 has a rotation shaft 310 (see FIG. 5) that is aligned substantially along the vertical direction.

Figure 3:
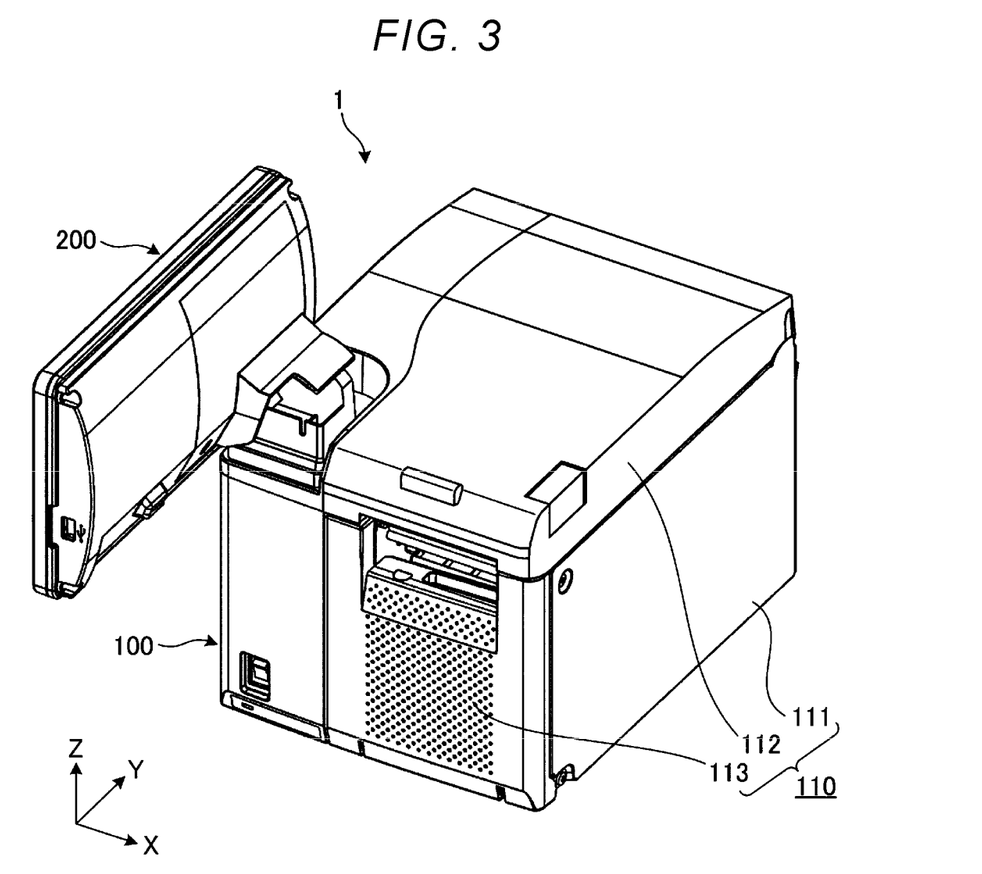
FIG. 3 is a perspective view illustrating the label printer illustrating a state where the upper cover and the front cover are closed and an operation panel is swiveled.
Figure 4:
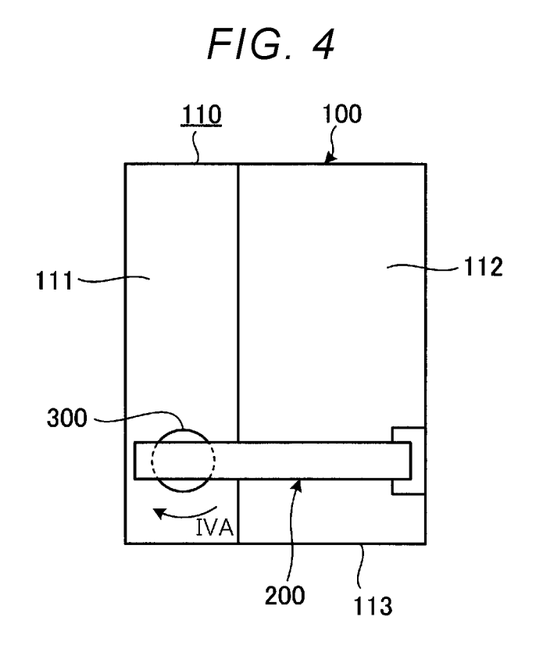
FIG. 4 is a schematic plan view illustrating the label printer.

FIG. 3 is a perspective view illustrating the label printer 1 illustrating when the upper cover 112 and the front cover 113 are closed and the operation panel 200 is swiveled. FIG. 4 is a schematic plan view illustrating the label printer 1. When the operation panel 200 is in an operation reception state in the orientation illustrated in FIG. 1, since the operation panel is positioned above the upper cover 112, the upper cover 112 cannot be opened. Therefore, in order to open the upper cover 112, it is necessary for the operation panel 200 to be swiveled to a position that does not interfere with the opening of the upper cover 112, e.g., to the position illustrated in FIG. 3. The swivel direction in this example is the direction of arrow IVA (see FIG. 4).

Figure 5:
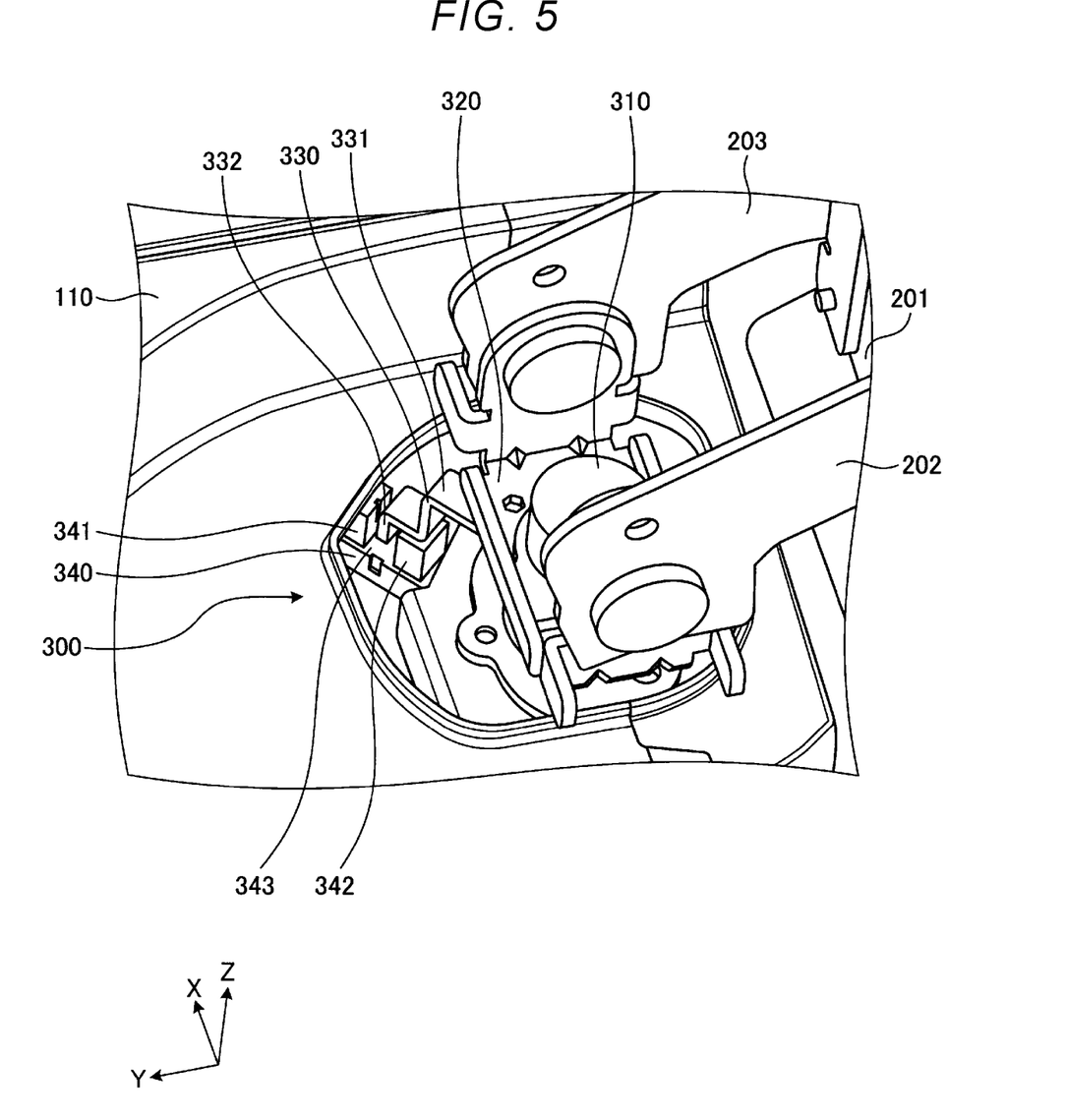
FIG. 5 is s perspective view illustrating an external appearance of a swivel unit and a vicinity thereof.

FIG. 5 is a perspective view illustrating an outer appearance of the swivel unit 300 and its vicinity. FIG. 5 is in a state viewed from the rear right side as represented by the three axes illustrated in FIG. 5.

The swivel unit 300 includes a support portion 320 and a light shielding plate 330 that rotates around the rotation shaft 310, and a light sensor 340. The support portion 320 supports a pair of arm portions 202 and 203 attached to the rear surface 201 of the operation panel 200 so as to be rotatable to accommodate tilting of the operation panel 200.

The light sensor 340 is fixedly provided on the side of the main body portion 100 and does not swivel (i.e., rotate around rotation shaft 310). The light sensor 340 includes a light emitting unit 341 and a light receiving unit 342, which forma gap 343 of a predetermined size therebetween. The light emitting unit 341 and the light receiving unit 342 are disposed so that the light receiving unit 342 can receive light emitted from the light emitting unit 341 and if the light receiving unit 342 captures light, it can be determined that there is no object in the slit 343 and if the light receiving unit 342 does not capture light, it can be determined that an object is present in the slit 343.

The control unit 150 receives the output of the light sensor 340.

The light shielding plate 330 rotates with the swivel of the operation panel 200. In other words, the light shielding plate 330 rotates along with the operation panel 200. The light shielding plate 330 has an arm portion 331 and a bent portion 332. The arm portion 331 is a portion extending from the swivel rotation shaft 310 in a direction orthogonal to the rotation shaft 310. The bent portion 332 is provided at a tip portion (at a side spaced apart from rotation shaft 310) of the arm portion 331, and moves in and out of the slit 343 of the light sensor 340 as the light shielding plate 330 rotates.

In a state where the label printer 1 is used, the operation panel 200 faces the front surface, and the bent portion 332 is present in the slit 343, that is, in a state where the light shielding plate 330 is detected by the light sensor 340. When the light shielding plate 330 is rotated beyond a predetermined threshold value (for example, about 5° as an angle in a plan view), the bent portion 332 moves out from the slit 343, and the light shielding plate 330 is not detected by the light sensor 340.

In response to the light sensor 340 not detecting the light shielding plate 330, the control unit 150 blocks receipt of any operation made on the input panel 220. In other words, the operation made on the input panel 220 becomes invalid.

Figure 6:
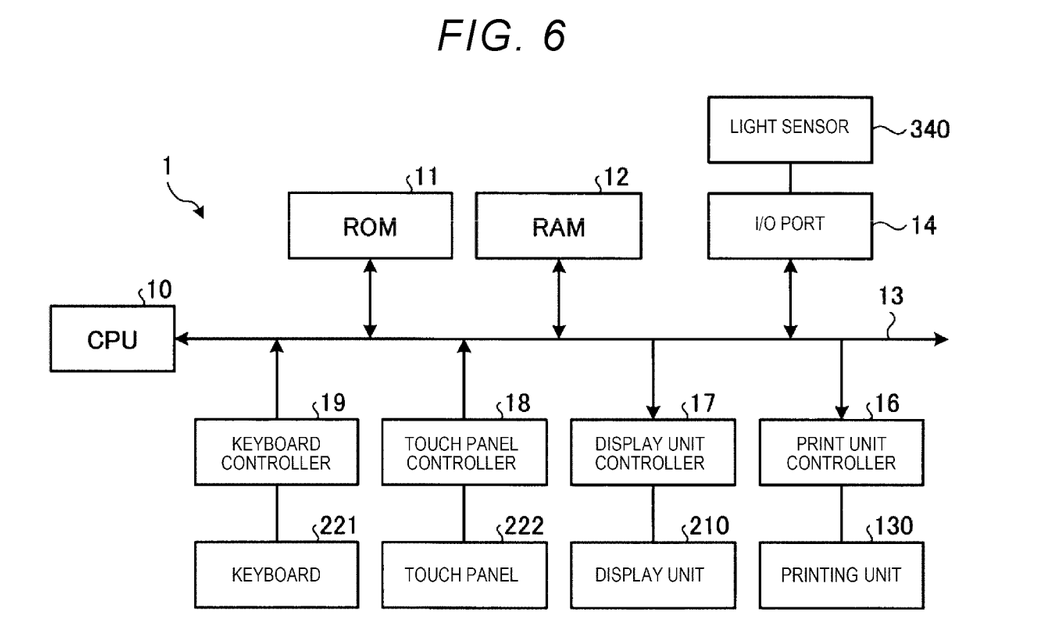
FIG. 6 is a block diagram illustrating an electrical connection of each hardware component of the label printer.

Next, FIG. 6 is a block diagram illustrating the electrical connection of each hardware component of the label printer 1. The label printer 1 includes a central processing unit (CPU) 10, a read only memory (ROM) 11, a random access memory (RAM) 12, a system bus 13, an I/O port 14, a printing unit controller 16, a display unit controller 17, a touch panel controller 18 and a keyboard controller 19.

The system bus 13 connects the CPU 10 and the units described above (ROM 11, RAM 12, I/O port 14, printing unit controller 16, display unit controller 17, touch panel controller 18, and keyboard controller 19).

The CPU 10, the ROM 11, and the RAM 12 make up the control unit 150. The CPU 10 executes various arithmetic processing and the like and centrally controls each unit. The ROM 11 is, for example, a flash ROM or the like, and stores fixed data in a non-volatile manner. The RAM 12 stores variable data in a volatile manner and is used as a work area or the like. In addition, in the ROM 11, a control program, a predetermined label format and various files to be described below are stored.

Figure 7:
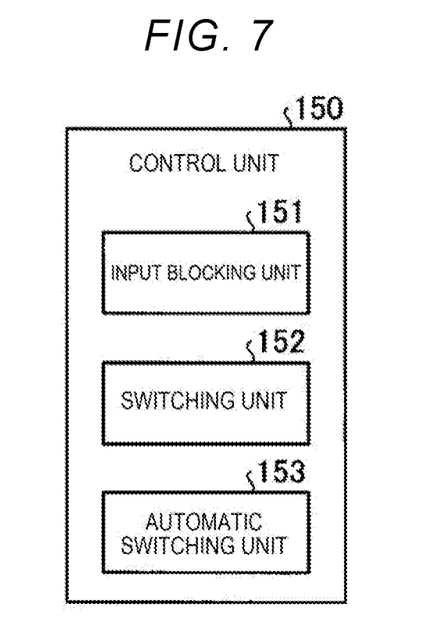
FIG. 7 is a block diagram illustrating functional units of a control unit of the label printer.

By executing the program, the CPU 10 functions, for example, as an input blocking unit 151, a switching unit 152, and an automatic switching unit 153. FIG. 7 is a block diagram illustrating the functional units of the control unit 150.

The input blocking unit 151 is a functional unit that blocks an erroneous input operation made on the input panel 220 from being received, e.g., when an input operation is made on the input panel 220 after the operation panel 200 is swiveled beyond a predetermined threshold value.

The switching unit 152 switches validity and invalidity of the input blocking unit 151. In other words, when the input blocking unit 151 is set to "valid" by the switching unit 152, the input blocking unit 151 performs the function of blocking inputs made on the input panel 220, and when the input blocking unit 151 is set to "invalid" by the switching unit 152, the input blocking unit 151 does not perform the function of blocking inputs made on tine input panel 220.

The automatic switching unit 153 sets the input blocking unit 151 to "valid" when a predetermined event requiring opening and closing of the upper cover 112 is generated and set to "invalid" in other cases. In the present embodiment, the predetermined event includes paper jam of the printing unit 130, paper replenishment due to the paper storage unit 120 being out of paper, or the like.

The control program executed by the label printer 1 is recorded and provided on a readable recording medium by a computer such as a CD-ROM, a flexible disk (FD), a CD-R, and a digital versatile disk (DVD) in a file in an installable format or an executable format.

In addition, the control program executed by the label printer 1 may be stored on a computer connected to a network such as the Internet and downloaded via the network. In addition, the control program executed by the label printer 1 may be provided or distributed via a network such as the Internet.

The I/O port 14 handles communication between the light sensor 340 and the CPU 10. The printing unit controller 16 drives and controls the printing unit 130. The display unit controller 17 drives and controls the display unit 210. The touch panel controller 18 drives and controls the touch panel 222. The keyboard controller 19 drives and controls the keyboard 221.

The CPU 10 uses the image memory provided in the RAM 12 to drive and control the display unit controller 17 based on image information stored in the ROM 11 or synthesized in the image memory. Accordingly, a large number of liquid crystal shutters in which the display unit 210 includes in matrix shapes are driven to be selectively opened and closed, and an image based on image information is displayed and output on the display unit 210.

Further, the CPU 10 drives and controls the touch panel controller 18 to recognize the position of the XY coordinates on the touch panel 222 touched by the operator, and acquires the coordinate data. Accordingly, by synchronizing the positional relationship between the button or the like displayed on the display unit 210 and the coordinates of the touch panel 222, the same function as the keyboard 221 is obtained by the combination of the touch panel 222 and the display unit 210.

Figure 8:
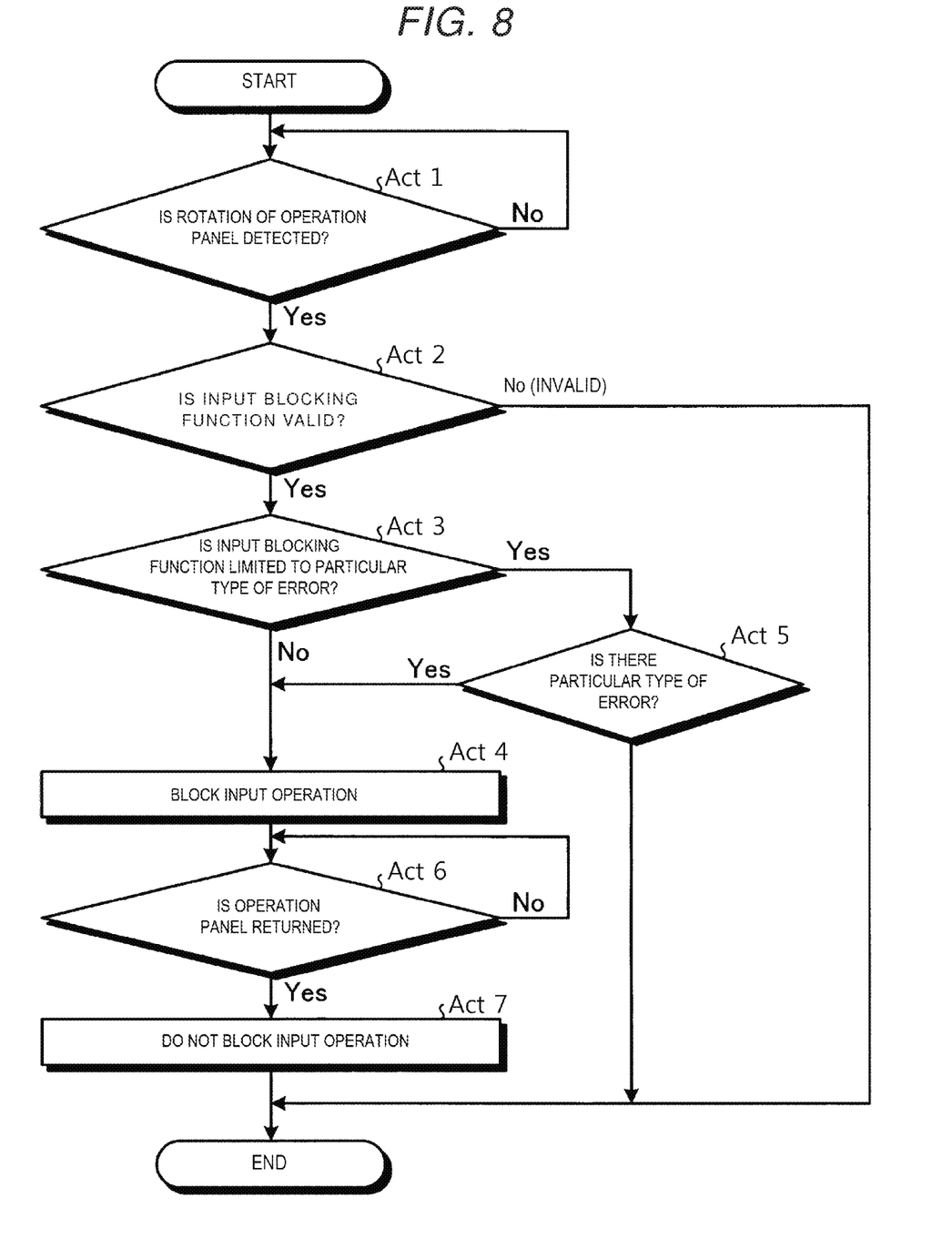
FIG. 8 is a flowchart illustrating a flow of processing executed by a CPU of the label printer.

FIG. 8 is a flowchart illustrating the flow of processing executed by the CPU 10. First, the CPU 10 waits for a change in the output of the light sensor 340 (No in Act 1). In Act 1, when the operation panel 200 is rotated beyond a predetermined threshold value and the light sensor 340 detects the movement of the light shielding plate 330 due to the rotation (Yes in Act 1), the CPU 10 (in particular, the switching unit 152) determines whether or not the input blocking function is set to valid (Act 2). When the input blocking function is set to invalid (No in Act 2), the CPU 10 ends the processing.

In Act 2, when the input blocking function is set to valid (Yes in Act 2), the CPU 10 (in particular, the automatic switching unit 153) determines whether or not the use of the input blocking function is limited to a particular type of error (e.g., paper jam or out of paper) (Act 3). In Act 3, if it is determined that the use of the input blocking function is not limited to the particular type of error (No in Act 3), the CPU 10 (in particular the input blocking unit 151) blocks any input operation made on the input panel 220 (Act 4).

In Act 3, if it is determined that use of the input blocking function is limited to the particular type of error (Yes in Act 3), the CPU 10 checks the presence or absence of the particular type of error (Act 5), and if the particular type of error is present (Yes in Act 5), the CPU 10 proceeds to the processing of Act 4 to block the input operation made on the input panel 220. On the other hand, if the particular type of error is absent (No in Act 5), the CPU 10 ends the process.

Next, the CPU 10 waits for the operation panel 200 to return to a use state of the label printer 1 (that is, state facing front surface) (No in Act 6), and when returning (Yes in Act 6), input operation made on the input panel 220 is permitted (Act 7) and the process is ended.

As described above, according to the present embodiment, when the operation panel 200 is swiveled to a certain extent or more, the operation on the operation panel 200 can become invalid. Accordingly, a malfunction due to reception of an unintended operation can be prevented.

In a case of the label printer 1 for positioning and using the operation panel 200 on a flow line of the upper cover 112 of the main body portion 100 as in this embodiment, when the inside of the main body portion 100 needs to be worked on, e.g., for maintenance, the upper cover 112 is opened, but, at that time, the operation panel 200 is moved by a swivel or the like. By detecting the movement of the operation panel 200 and appropriately controlling the operation panel 200 based on the detection result, the problem of erroneous inputs can be prevented.

In the embodiment described above, although the operation panel 200 is connected to the upper surface of the main body portion 100, and the operation becomes invalid when the operation panel 200 is swiveled, in implementation, as long as the operation becomes invalid when the orientation of the operation panel 200 with respect to the main body portion 100 is changed, another structure may be used. In other words, how to move the operation panel 200 with respect to the main body portion 100 is not limited to the swivel. For example, the operation panel 200 may be connected not to the upper surface but to the front surface of the main body portion 100. In addition, for example, the operation panel 200 may be rotatable in the tilt direction with respect to the main body portion 100. More specifically, for example, the front surface of the casing 110 can be openable and closable, and the operation panel 200 is connected to the front surface, and is tilted to a position where it will not interfere with the opening and closing.

In addition, in the present embodiment, although the input panel 220 is integrated with the display unit 210, the display unit 210 may be separate from the display unit 210 in implementation.

Further, in the present embodiment, the label printer 1 is described as an example of the information processing apparatus. Another example of the information processing apparatus is an apparatus used as a POS terminal apparatus. In this case, the opening and closing of the upper cover 112 is performed, for example, for replenishing or replacing a receipt printer paper, corresponding to a jam of a receipt printer, collection of bills and coins, replenishment, countermeasure against clogging, and the like.

In addition, in the present embodiment, although the label printer 1 includes all of the input blocking unit 151, the switching unit 152, and the automatic switching unit 153, the switching unit 152 and the automatic switching unit 153 are optional, and may be omitted.

Further, in the present embodiment, although the light sensor 340 is described as an example of the detection unit, in implementation, the detection unit may be realized by another device such as a slit sensor, a mechanical switch, a rotary encoder.

The program executed by the label printer 1 according to the present embodiment is stored in advance in a ROM or the like.

The program executed by the label printer 1 of the present embodiment may be recorded on a readable recording medium such as a CD-ROM, a flexible disk (FD), a CD-R, a DVD (Digital Versatile Disk), or the like in a file in an installable format or an executable format.

Further, a program executed by the label printer 1 of the present embodiment may be stored in a computer connected to a network such as the Internet and downloaded via the network. In addition, the program executed by the label printer 1 of the present embodiment may be distributed via a network such as the Internet.

The program executed by the label printer 1 according to the present embodiment has a modular configuration including each unit described above (input blocking unit 151, switching unit 152, and automatic switching unit 153). The CPU (processor) reads the program from the storage medium and executes the program to load each unit described above into the main storage device. Accordingly, the input blocking unit 151, the switching unit 152, and the automatic switching unit 153 are stored in the main storage device to be executed therefrom.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a casing;
   a cover that is movable to an open position to provide access to an interior of the casing;
   an operation panel configured to receive an input operation and mounted on the casing to be movable between a first position at which the operation panel interferes with the opening of the cover and a second position at which the operation panel does not interfere with the opening of the cover; and
   a processor configured to:
      determine whether or not the information processing apparatus is in error;
      determine whether or not an input blocking function is limited to in an error state when the information processing apparatus is in error, when the operation panel moves to the second position;
      block an input operation received by the operation panel when determining that the input blocking function is not limited to in the error state;
      block the input operation received by the operation panel when determining that the input blocking function is limited to in the error state and that the information processing apparatus is in error; and
      process in accordance with the input operation received by the operation panel when determining that the input blocking function is limited to in the error state and that the information processing apparatus is not in error.

2. The information processing apparatus according to claim 1, wherein the operation panel is mounted on a swivel unit that is attached to the casing, and the operation panel is moved to the second position by swiveling.

3. The information processing apparatus according to claim 2, wherein the operation panel swivels from the first position to the second position by an angle that is greater than a predetermined threshold angle.

4. The information processing apparatus according to claim 3, further comprising:
   a sensor configured to detect that the operation panel is swiveled by an angle greater than the predetermined threshold angle.

5. The information processing apparatus according to claim 4, wherein the sensor includes an optical sensor configured to detect an object when the operation panel is in the first position and to not detect the object when the operation panel is in the second position.

6. The information processing apparatus according to claim 5, wherein the object moves as the operation panel swivels.

7. The information processing apparatus according to claim 1, wherein the casing has housed therein a roll holder, a print head positioned to print on paper that is unwound from a roll held by the roll holder, and a paper discharge port through which the paper on which printing has been carried out by the print head is discharged.

8. The information processing apparatus according to claim 7, wherein the roll held by the roll holder is a label paper roll.

9. The information processing apparatus according to claim 7, wherein the roll held by the roll holder is a receipt paper roll.

10. A method of preventing erroneous inputs to an operation panel mounted on a casing of an information processing apparatus from being processed, said method comprising:
  determine whether or not the information processing apparatus is in error; swiveling the operation panel away from a normal position thereof at which the operation panel interferes with an opening of a cover of the casing;
  detecting an amount of swivel of the operation panel; determining that the amount of swivel is greater than a threshold amount; and upon determining that the amount of swivel is greater than the threshold amount,
  determining whether or not an input blocking function is limited to in an error state when the information processing apparatus is in error;
  upon determining that the input blocking function is not limited to in the error state, blocking an input made on the operation panel;
  upon determining that the input blocking function is limited to in the error state and that the information processing apparatus is in error, blocking the input made on the operation panel;
  upon determining that the input blocking function is limited to in the error state and that the information processing apparatus is not in error, processing in accordance with the input made on the operation panel.

\* \* \* \* \*